(12) United States Patent
Agonia et al.

(10) Patent No.: US 10,508,019 B2
(45) Date of Patent: Dec. 17, 2019

(54) LISTING BEAD FOR UPHOLSTERY CLIPS

(71) Applicant: Hope Global, Division of NFA Corp., Cumberland, RI (US)

(72) Inventors: Jeffrey A. Agonia, Lincoln, RI (US); Andrew W. Santin, Beverly, MA (US); Aleksandr V. Boguk, North Providence, RI (US)

(73) Assignee: Hope Global, Division of NFA Corp., Cumberland, RI (US)

( * ) Notice: Subject to any disclaimer, the term of this patent is extended or adjusted under 35 U.S.C. 154(b) by 0 days.

(21) Appl. No.: 15/831,294

(22) Filed: Dec. 4, 2017

(65) Prior Publication Data
US 2018/0155182 A1    Jun. 7, 2018

Related U.S. Application Data

(63) Continuation of application No. 14/839,386, filed on Aug. 28, 2015, now Pat. No. 9,834,431.

(51) Int. Cl.
*B60N 2/58*  (2006.01)
*A47C 31/02* (2006.01)
*B68G 7/12*  (2006.01)

(52) U.S. Cl.
CPC ............. *B68G 7/12* (2013.01); *B60N 2/5825* (2013.01)

(58) Field of Classification Search
CPC ................................ B60N 2/5825; B68G 7/12
USPC ..................... 297/218.1, 218.2, 218.3, 218.5
See application file for complete search history.

(56) References Cited

U.S. PATENT DOCUMENTS

| | | |
|---|---|---|
| 316,062 A | 4/1885 | Riessner |
| 2,448,900 A | 9/1948 | Mayo |
| 3,632,164 A | 1/1972 | Radke |
| 3,649,974 A | 3/1972 | Baruth et al. |
| 3,747,178 A | 7/1973 | Harder, Jr. et al. |
| 3,794,378 A | 2/1974 | Haslam et al. |
| 3,807,675 A | 4/1974 | Seckerson et al. |
| 3,981,534 A | 9/1976 | Wilton |
| 3,988,034 A | 10/1976 | Fister |
| 3,995,892 A | 12/1976 | Hellman et al. |

(Continued)

FOREIGN PATENT DOCUMENTS

| | | |
|---|---|---|
| CA | 2165930 A1 | 6/1996 |
| CA | 2368739 A1 | 7/2002 |

(Continued)

*Primary Examiner* — Rodney B White
(74) *Attorney, Agent, or Firm* — Loginov & Associates, PLLC

(57) ABSTRACT

A listing bead for use in securing upholstery trim covers to upholstery clips embedded in a foam substrate that includes finger-friendly formations on its surface. The formation in an illustrative embodiment defines a flat top at the upper end of a neck that extends between the bead and the top. Illustratively, the top is formed in two outwardly bent L-shapes extending at right angles in opposing directions from the neck. The bead, neck and flat top define confronting halves, joined at the bottom edge, which encase a web that is constructed and arranged to be secured to the trim cover by adhesives, and/or welding stitching. The web illustratively includes punched and/or cut holes (tactile indicia) at predetermined intervals therealong that provide visual and tactile feedback to the installer on the approximate location of clips in the substrate during assembly.

20 Claims, 7 Drawing Sheets

(56) References Cited

U.S. PATENT DOCUMENTS

| | | |
|---|---|---|
| 4,114,241 A | 9/1978 | Bisping |
| 4,306,697 A | 12/1981 | Mathews |
| 4,446,450 A | 5/1984 | Boulanger et al. |
| 4,470,179 A | 9/1984 | Gollin et al. |
| 4,663,211 A | 5/1987 | Kon |
| 4,673,542 A | 6/1987 | Aligner et al. |
| 4,789,201 A | 12/1988 | Seibert |
| 4,861,104 A | 8/1989 | Malak |
| 4,881,997 A | 11/1989 | Hatch |
| 4,933,224 A | 6/1990 | Hatch |
| 4,988,282 A | 1/1991 | Fukui |
| 5,005,242 A | 4/1991 | Kennedy et al. |
| 5,013,090 A | 5/1991 | Matsuura |
| 5,023,125 A | 6/1991 | Gray |
| 5,028,472 A | 7/1991 | Gray |
| 5,110,649 A | 5/1992 | Morse et al. |
| 5,180,618 A | 1/1993 | Kessler et al. |
| 5,236,243 A | 8/1993 | Reyes |
| 5,259,905 A | 11/1993 | Gilcreast |
| 5,273,597 A | 12/1993 | Kumagai et al. |
| 5,286,431 A | 2/1994 | Banfield et al. |
| 5,326,151 A | 7/1994 | Smith et al. |
| 5,338,092 A | 8/1994 | Wiltsey et al. |
| 5,342,569 A | 8/1994 | Murasaki |
| 5,401,075 A | 3/1995 | Venuto et al. |
| 5,459,907 A | 10/1995 | Nivet |
| 5,582,463 A | 12/1996 | Linder et al. |
| 5,605,373 A | 2/1997 | Wildern, IV et al. |
| 5,641,552 A | 6/1997 | Tillner |
| 5,658,046 A | 8/1997 | Rus |
| 5,718,478 A | 2/1998 | Allison |
| 5,733,001 A | 3/1998 | Roberts |
| 5,766,723 A | 6/1998 | Oborny et al. |
| 5,786,061 A | 7/1998 | Banfield |
| 5,827,546 A | 10/1998 | Burchi et al. |
| 5,827,547 A | 10/1998 | Burchi et al. |
| 5,882,073 A | 3/1999 | Burchi et al. |
| 5,900,303 A | 5/1999 | Billarant |
| 6,009,676 A | 1/2000 | Feldpausch et al. |
| 6,109,569 A | 8/2000 | Sakaida |
| 6,173,545 B1 | 1/2001 | Feldpausch et al. |
| 6,177,155 B1 | 1/2001 | Kurosaki |
| 6,397,638 B1 | 6/2002 | Roell |
| 6,406,093 B1 | 6/2002 | Miotto et al. |
| 6,431,585 B1 | 8/2002 | Rickabus et al. |
| 6,592,181 B2 | 7/2003 | Stiller et al. |
| 6,656,563 B1 | 12/2003 | Leach et al. |
| 6,668,429 B2 | 12/2003 | Fujisawa et al. |
| 6,838,155 B2 | 1/2005 | Cappucci et al. |
| 6,969,832 B1 | 11/2005 | Daughtry, Sr. |
| 7,444,792 B2 | 11/2008 | Matson |
| 7,487,575 B2 | 2/2009 | Smith |
| 7,559,100 B2 | 7/2009 | Pedde et al. |
| 8,091,184 B2 | 1/2012 | Santin et al. |
| 8,099,837 B2 | 1/2012 | Santin et al. |
| 8,197,010 B2 | 6/2012 | Galbreath et al. |
| 8,857,018 B2 | 10/2014 | Murasaki et al. |
| 9,526,302 B2 | 12/2016 | Saiga et al. |
| 9,834,431 B2 * | 12/2017 | Agonia ............... B60N 2/5825 |
| 2001/0007166 A1 | 7/2001 | Shimamura et al. |
| 2002/0101109 A1 | 8/2002 | Stiller et al. |
| 2003/0001421 A1 | 1/2003 | Schmidt |
| 2003/0072912 A1 | 4/2003 | Itoh et al. |
| 2003/0134083 A1 | 7/2003 | Wang et al. |
| 2003/0162008 A1 | 8/2003 | Cappucci et al. |
| 2003/0204939 A1 | 11/2003 | Fujisawa et al. |
| 2003/0213105 A1 | 11/2003 | Bednarski |
| 2003/0215601 A1 | 11/2003 | Pedde et al. |
| 2003/0236315 A1 | 12/2003 | Xie et al. |
| 2003/0236316 A1 | 12/2003 | Heumen et al. |
| 2004/0061254 A1 | 4/2004 | Snooks |
| 2004/0064894 A1 | 4/2004 | Labish |
| 2004/0082674 A1 | 4/2004 | Smith et al. |
| 2004/0137192 A1 | 7/2004 | McVicker |
| 2004/0195877 A1 | 10/2004 | Demain et al. |
| 2005/0006944 A1 | 1/2005 | Ali et al. |
| 2007/0069559 A1 | 3/2007 | Poulakis |
| 2015/0089773 A1* | 4/2015 | Kheil .................... B29C 43/28 |
| | | 24/114.5 |

FOREIGN PATENT DOCUMENTS

| | | |
|---|---|---|
| CA | 2420373 A1 | 8/2003 |
| CA | 2427371 A1 | 11/2003 |
| DE | 4446450 C1 | 4/1996 |
| DE | 19530397 A1 | 2/1997 |
| DE | 19734408 A1 | 2/1999 |
| DE | 29821697 U1 | 3/1999 |
| DE | 29822649 U1 | 5/1999 |
| DE | 29917372 U1 | 2/2000 |
| DE | 19949423 C1 | 1/2001 |
| DE | 19959235 A1 | 6/2001 |
| DE | 102014011341 A1 | 2/2015 |
| EP | 0421258 A1 | 4/1991 |
| EP | 0433100 B1 | 6/1991 |
| EP | 0439969 B1 | 8/1991 |
| EP | 0960782 B1 | 12/1991 |
| EP | 0960783 B1 | 12/1991 |
| EP | 0532820 B1 | 3/1993 |
| EP | 0900030 B1 | 3/1993 |
| EP | 0667257 B1 | 8/1995 |
| EP | 0708000 A2 | 4/1996 |
| EP | 0720900 B1 | 7/1996 |
| EP | 0727294 A1 | 8/1996 |
| EP | 0990546 B1 | 4/2000 |
| EP | 0990554 A1 | 4/2000 |
| EP | 1000855 A2 | 5/2000 |
| EP | 1000856 B1 | 5/2000 |
| EP | 1116450 A2 | 7/2001 |
| EP | 1220628 B1 | 7/2002 |
| EP | 1243462 A2 | 9/2002 |
| EP | 1300229 A1 | 4/2003 |
| EP | 1358826 A1 | 11/2003 |
| EP | 1769967 A1 | 4/2007 |
| FR | 2777879 A1 | 10/1999 |
| GB | 1560234 | 1/1980 |
| GB | 2238708 A | 6/1991 |
| WO | 8603164 A1 | 5/1986 |
| WO | 9219119 A1 | 11/1992 |
| WO | 9501741 A1 | 1/1995 |
| WO | 9720690 A1 | 6/1997 |
| WO | 9805232 A1 | 2/1998 |
| WO | 9820766 A1 | 5/1998 |
| WO | 0100386 A1 | 1/2001 |
| WO | 0124665 A1 | 4/2001 |
| WO | 0189338 A2 | 11/2001 |
| WO | 0205686 A2 | 1/2002 |
| WO | 03031223 A1 | 4/2003 |
| WO | 03058005 A2 | 7/2003 |
| WO | 03059111 A1 | 7/2003 |
| WO | 03070509 A2 | 8/2003 |
| WO | 03072390 A1 | 9/2003 |
| WO | 2004028789 A1 | 4/2004 |
| WO | 2004058496 A1 | 7/2004 |
| WO | 2007008662 A2 | 1/2007 |

* cited by examiner

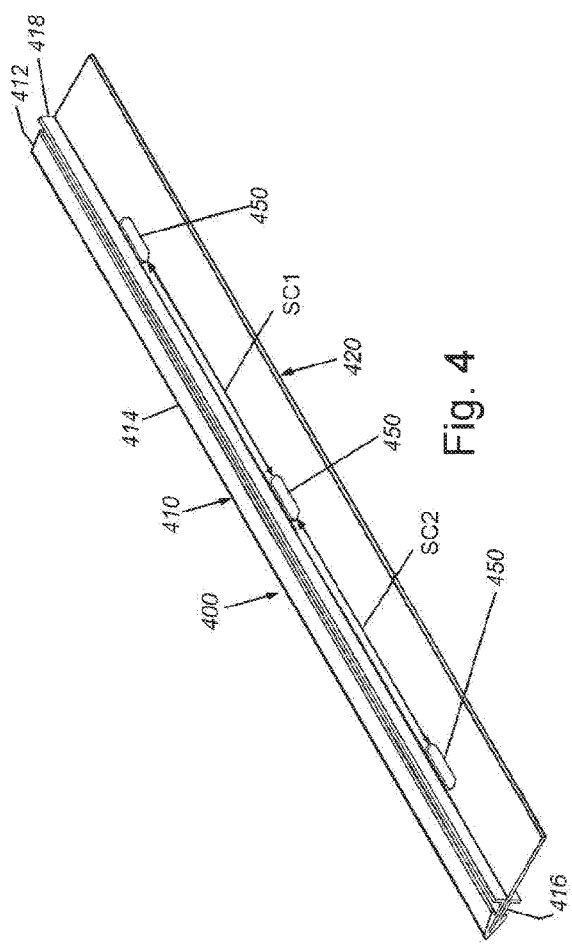
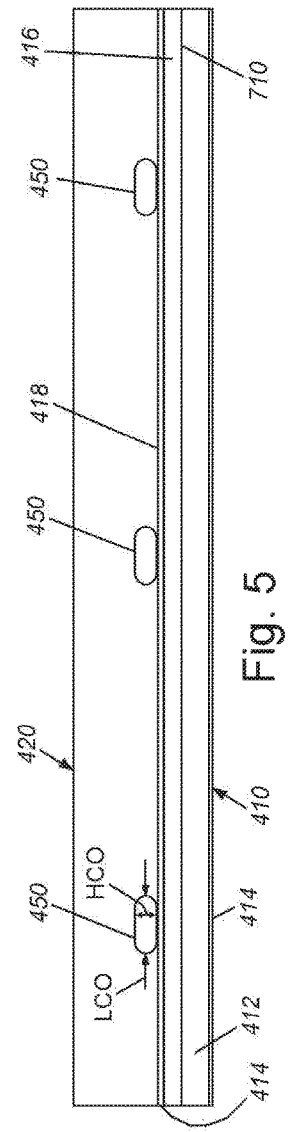
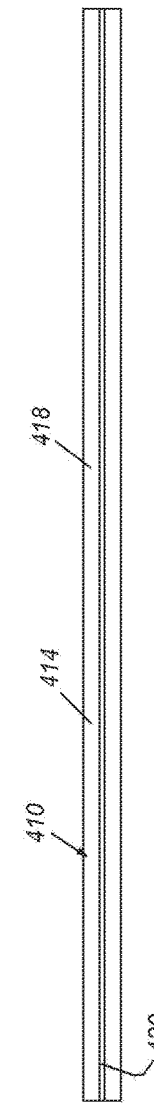
Fig. 4
Fig. 5
Fig. 6

LISTING BEAD FOR UPHOLSTERY CLIPS

RELATED APPLICATIONS

This application is a continuation of U.S. patent application Ser. No. 14/839,386, entitled LISTING BEAD FOR UPHOLSTERY CLIPS, filed Aug. 28, 2015, now U.S. Pat. No. 9,834,431 B2 issued Dec. 5, 2017, which is incorporated by reference herein in its entirety.

FIELD OF THE INVENTION

This invention relates to trim and upholstery attachment mechanisms, and more particularly to systems for attaching trim and upholstery to foam and other resilient or flexible substrates using clips in the foam and listing beads that snap into, and are retained by, the clips.

BACKGROUND OF THE INVENTION

Modern fabric trim covers and their interconnected spring and cushion components (collectively termed "upholstery"), such as those used in vehicles, often carefully sculpted and shaped to produce a comfortable and aesthetically pleasing effect. As such, the fabric (typically cloth, vinyl or leather with an appropriate backing material) is secured at many locations along its surface to a resilient or flexible backing that defines the cushioned substrate of the upholstered item (for example, a seat bottom, cushion, back or headrest). The substrate is typically constructed from a resilient material. This resilient/flexible material can be synthetic foam (for example polyurethane and/or isocyanate-based foam) or another cushioning material, such as traditional rubberized horsehair, hog hair, coil springs and the like. In general, the close-fitting appearance of the upholstery to the substrate requires that the fabric be tacked down to the substrate at any intermediate surface contour dips, Vees or trenches in the surface. Otherwise, the fabric will tend to billow out or "tent" at these non-planar surface features.

Trim covers are often secured to resilient substrates using detachable connections that allow repairs to be effected and are often more-easily applied without the used of highly skilled labor. In one example, one side of a hook and loop fastener is attached to a trench in the resilient substrate. The inner surface of the trim cover carries the opposing side of the fastener. This approach is reliable, but expensive, in terms of material wasted and consumed to attain a secure fit. It also requires a rather large-width trench/trough to be formed in the resilient substrate to ensure a sufficient area of engagement between fastener sides. Other approaches can be employed to secure upholstery trim covers to sear cushions but all generally have disadvantages due to complexity in assembly, limitations in service life, etc.

A more effective approach to efficiently and securely attach trim covers to a foam substrate involves the use of resilient polymer trim clips that are embedded in, and adhered to, the foam. With reference FIG. 1, an example of an upholstery clip 100 is shown embedded in a foam substrate 102. The upholstery clip 100 resides within a trench 104 formed in the substrate 102. The clip 100 in this example is a low-profile clip as described in commonly assigned U.S. Pat. No. 8,099,837, entitled LOW-PROFILE UPHOLSTERY CLIP FOR ATTACHING A BEAD TO A FOAM SUBSTRATE, the teachings of which are incorporated herein by reference as useful background information. This exemplary clip 100 includes a planar (flat) rectangular base 110 and an upwardly directed clip member 150 with associated legs 160, and inwardly and downwardly directed barbs 170 adapted to capture a listing bead through a gap 180 therebetween, as described below. The base 110 can define a width (perpendicular to the page of the drawing) of approximately 6 to 9 millimeters with an illustrative value of 7.8 millimeters. The base width is widely variable in alternate embodiments and a wide variation of widths is expressly contemplated beyond the above-specified, exemplary width values. The clip legs 160 have a similar width to that of the base, or are typically narrower than the base width. In general, the base should be wide enough so as to support clip member legs of a desired size. This maintains the strength of the clip member legs. Legs that are too narrow will be more likely to break or fracture during installation of listing or in subsequent field use. By varying the width of (at least) the legs, the performance characteristics of the clip can be varied to accommodate different ranges of push-in and pull-out force, as well as overall load-handling capability. By experimental data, the appropriate width WB of the legs (and optionally the base) can be determined for a given application.

The clip base 110 in this example includes formations 112 and 114 on opposing ends, which are optional and allow for a "festooning" arrangement, wherein clips can be snapped together in a variable-length, flexible chain during storage and distribution by engaging each cylindrical formation 114 with an overlying C-formation 112 on an adjacent clip. Before foam is injected into a mold cavity, the installer peels each clip off of the chain by removing the cylinder formation 114 from an adjacent C-formation 112, and applies it to an appropriate location (e.g. along a trench) within mold cavity. Note that the length LB of the clip base between festooning connectors 112, 114 is highly variable, but is approximately 12-18 millimeters in this example. The thickness TB (FIG. 1) of the base is also highly variable, but is between approximately 1.0 and 2.0 millimeters with an illustrative value of 1.52 millimeters in this example. In general, any clip base herein should have sufficient area to allow it to appropriately adhere to, and become permanently anchored within, the foam substrate free of pull-out under normal loads.

Note also that the base thickness TB can be sized to approximately match (or be greater than) the thickness TL of the legs. Combined with appropriate stress-relieving fillets at the leg roots (interconnections with the base), the overall, substantially uniform thickness of the clip's clamping region (i.e. the legs and intervening base segment) effectively distributes the load from bead-installation flexure and pull-out tension uniformly over the entire clip member structure. This helps to better avoid clip breakage during clip and bead installation and subsequent field use of the installed clip and affords, essentially a C-clamp-effect to the bead by the clip.

FIGS. 2 and 3 show the installation of a typical, prior art listing bead 210 into a low-profile clip in accordance with this embodiment. In FIG. 2, the listing bead 210 is attached at the end of a web 220 (a fabric), which is, itself, attached to an overlying upholstery piece (not shown). The exemplary listing bead 210 of can be formed as a continuous extrusion from an acceptable polymer, and includes a pair of upper walls 230 that are defined at an approximate angle AW with respect to the horizontal line 231. The bead upper walls 230 are arranged to engage the bottom faces 232 of the barbs 170. During assembly, the listing is driven downwardly (arrow 250) toward the gap 180 between the clip member legs/barbs. The maximum width WGB of the listing bead 210 is wider than the width of the gap 180 when the legs are in a resting (unsprung) arrangement. Thus, the listing bead 210 deforms slightly as its rounded lower faces 260 pass through the barbs 170, and the reduced thickness legs 160 flex outwardly (outward arrows 227) in response to the pressure applied by the bead 210 as it engages the rounded ends of the barbs 170.

In FIG. 3, the bead 210 has passed fully through the gap 180 and is now resting (bottomed-out) against the base 110. So long as the central region of the clip is high enough to allow the upper walls 230 of the bead 210 to clear the bottom faces 232 of the barbs 170, then the clip legs 160 are allowed to flex back (inward arrows 320) into their original resting (unsprung) shape. After installation, the natural tension placed upon the attached upholstery covering will generally bias the upper walls 230 of the listing bead into firm engagement with the bottom faces 232 of the barbs 170. This tension, and the relatively close conformance of widths of the clip central region and bead (as shown in FIG. 3), ensures a rattle-free interconnection between the foam substrate and trim cover.

While the above-described, exemplary clip and listing arrangement provides an efficient and reliable mechanism for joining trim covers to foam substrates, it can cause fatigue to workers installing trim covers by hand to the foam substrate. In many applications the use of human installers can be preferred to automated techniques as it allows for more customization and variation in seat designs than is practical when using an automated/robotic assembly system. In particular, the depicted listing bead contains sharp edges (i.e. corners 290 in FIG. 2) on its upper surface that dig into the installers fingers as he or she applies assembly pressure to drive the bead into the clip(s). This can limit a worker's time on the assembly line and otherwise cause undesired discomfort.

SUMMARY OF THE INVENTION

This invention overcomes disadvantages of the prior art by providing a listing bead for use in securing upholstery trim covers to upholstery clips embedded in a foam substrate that includes finger-friendly formations on its surface. The formation in an illustrative embodiment defines a flat top at the upper end of a neck that extends between the bead and the top. Illustratively, the top is formed in two outwardly bent L-shapes extending at right angles in opposing directions from the neck. The bead, neck and flat top define confronting halves, joined at the bottom edge, which encase a web, illustratively composed of a strip of synthetic or natural (woven or non-woven) fabric that is constructed and arranged to be secured to the trim cover by stitching or other securing/fastening techniques. Illustratively, the web can be formed from a material that fuses to the bead structure as it exits an extrusion die at near-melt temperature. The web illustratively includes punched and/or cut holes at predetermined intervals therealong that provide visual and tactile feedback to seat cover assemblers/operators and the seat assembler/installer (who manually inserts the bead) on the approximate location of clips in the substrate during assembly.

In an illustrative embodiment, a listing for assembling trim covers to a foam substrate containing one or more clips is provided. A listing bead assembly defines a cross section with tapered shape with a bottom tip and upper barbs. A neck extends above the barbs, and a top expands outwardly, perpendicular to the tip and barbs on at least one side of the bead assembly. The top provides a surface for contact of an installer's finger therewith when providing a push-in force to engage the bead assembly with the one of the clips. Illustratively, the bead assembly defines a pair of opposing halves that sandwich a web for attachment to the trim cover, the web includes one or more tactile indicia located in positions relative to the clips in the foam substrate during assembly of the listing to the clips. In an embodiment, the tactile indicia can define cutouts. The top can extend outwardly in opposing directions from the neck on each of the opposing halves, and/or can define an overall outward extension width of between approximately 4 and 10 millimeters. Illustratively, the bead assembly and the web are each composed of thermoplastic (e.g. polypropylene, polyethylene, etc.), and are bonded together. In an embodiment, the bead assembly is formed by extrusion in an extrusion die, and the web is sandwiched to the bead assembly as it exits an extrusion die in a semi-hardened state. In embodiments, the top defines a substantially flat upper surface and the top and neck collectively define a T-shape and/or can define thickness perpendicular to the width of approximately 0.5-2.5 millimeters, and more particularly 1 millimeter. Illustratively, the bead's tapered shape defines a pair of opposing surfaces oriented at an angle of approximately 25 degrees with respect to each other. The neck can illustratively define a thickness that is constructed and arranged to generate flexure in opposing legs of an engaged clip when the barbs of the clip that define the gap press against the neck under pressure—thereby reducing rattle in the assembled vehicle seat. Such a vehicle seat can be constructed with the clips of the foam substrate in engagement with the above-described listing.

In an illustrative embodiment, a method for assembling a trim cover to a vehicle seat to a foam substrate containing clips is provided. The method includes positioning of a listing bead assembly, defining a cross section with tapered shape with a bottom tip and upper barbs, a neck extending above the barbs and a top that expands outwardly on at least one side of the bead assembly, with respect to the foam substrate and associated clips. The top of the bead is engaged with a finger and a push-in force is applied to engage the bead assembly with the one of the clips so that the upper barbs of the bead assembly become captured by barbs of each of the clips. The clips can be located in a trench of the foam substrate, and the assembler/installer aligns the listing bead with the clips based upon indicia provided in the web. These indicia can comprise holes formed through the web adjacent to the bead.

BRIEF DESCRIPTION OF THE DRAWINGS

The invention description below refers to the accompanying drawings, of which:

FIG. 4 is a perspective view of an exemplary length of a flat top listing including a bead assembly and web according to an illustrative embodiment;

FIG. 5 is a frontal view of the illustrative listing of FIG. 4;

FIG. 6 is a top view of the illustrative listing of FIG. 4;

DETAILED DESCRIPTION

Figure 1:
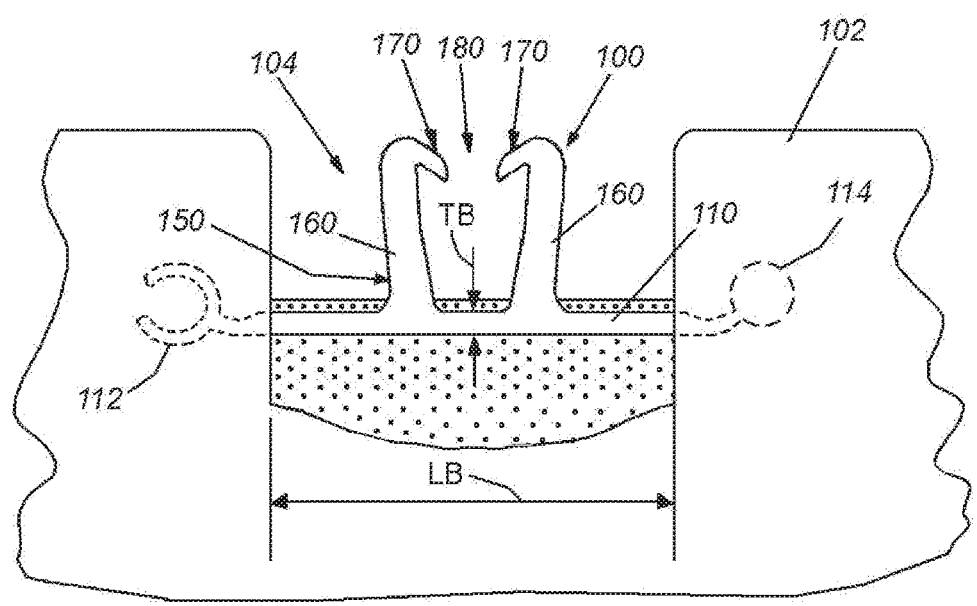
FIG. 1 is a partially exposed side view of a foam substrate in the region of a trough containing an embedded upholstery clip for use in conjunction with the flat-top listing of the illustrative embodiment.
Figure 2:
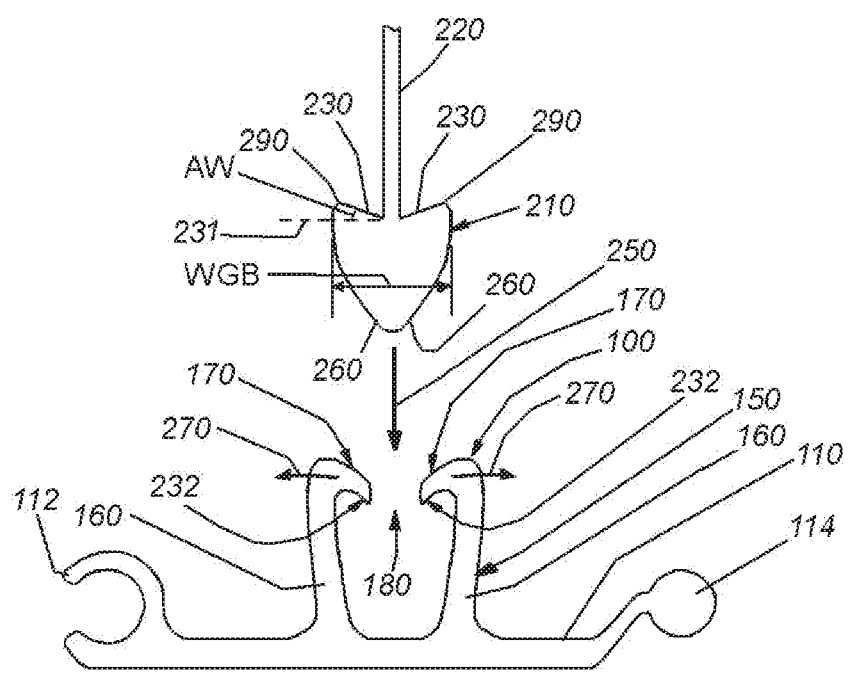
FIG. 2 is a side view of the illustrative clip of FIG. 1 showing the insertion thereinto an of exemplary listing of an upholstery piece.
Figure 3:
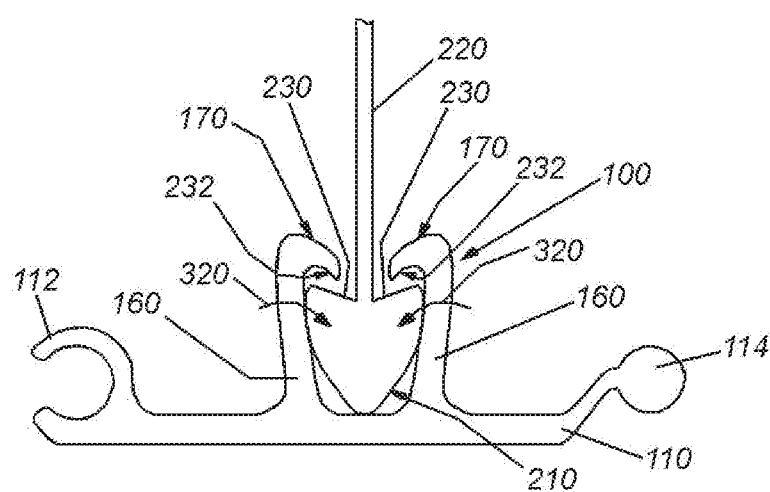
FIG. 3 is a side view of the resulting interconnection of the clip and listing as shown in FIG. 2.

Reference is made to FIGS. 4-7 that depict a flat top listing 400 according to an illustrative embodiment. The listing 400 comprises a bead assembly 410 and an engaged/adhered fabric web 420. The bead assembly 410 defines a bead 412 with a cross-sectional shape extending extends downwardly to a rounded point 414 in the shape of an arrow from upper barbs 710 (FIG. 7) at the upper ends that are arranged to engage the conforming barbs of the clip, as described further below. The bead 412 is supported on a narrowed neck 416 that terminates at the top in a perpendicularly oriented "flat" top 418, according to the illustrative embodiment.

The bead tip 414 bridges and joins opposing halves of the bead assembly 410 each defining and opposing, mirror image of the cross sectional profile of bead 412, barb 710, neck 416, and top 418. The two halves sandwich the web 420, which is constructed from any acceptable material in any acceptable manner—for example a woven or non-woven polypropylene, or other synthetic or natural fabric. The web material is somewhat flexible and can be readily stitched, fastened, adhered and/or fused (by heating, melting, ultrasonic welding, etc.) into engagement with the seat trim cover. In an embodiment, the web 420 is introduced between the halves of the bead assembly 410 as it exits an extrusion die (described further below referring to FIG. 10) and the halves of the semi-hardened bead (existing the die) are folded about the bead tip 414 so that the each contact, and fuse to an opposing side of the web. The bead in this embodiment is also constructed from a synthetic material—for example a thermoplastic, such as polypropylene, polyethylene, etc.—which is generally flexible so that it conforms to the curves of the foam substrate when installed in the clips. In alternate embodiments, the bead can be secured to the web by another technique that may or may not involve sandwiching it between halves—in particular the geometry of the bead described herein can be used with a different form of web attachment arrangement. For example, the web can be adhered to the flat top of a solid bead. Similarly, the halves can be joined to the web by adhesives, welding, melt-fusion, etc.

Figure 7:
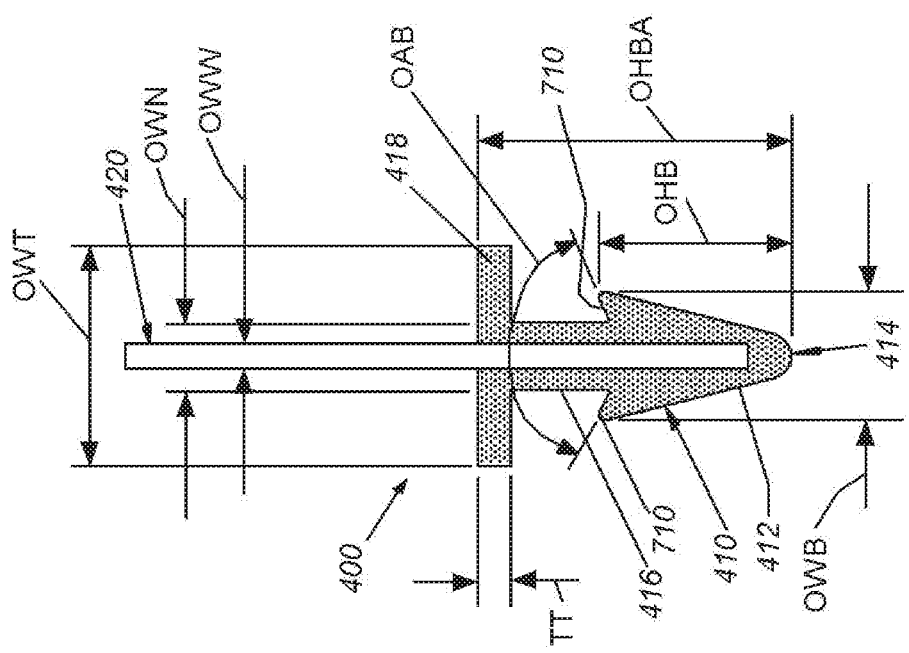
FIG. 7 is a side view of the illustrative listing of FIG. 4 showing relative dimensions of the various components of the bead assembly and web.

While the dimensions of the bead 410 and web 420 are highly variable, the following exemplary dimensions can be employed in an embodiment. Referring to FIG. 7, the overall width OWB of the bead 412 is approximately 3.5 to 5.0 (e.g. 3.7) millimeters with an exemplary tip (414) radius of approximately 0.8 millimeters. The overall bead height OHB is approximately 4 to 7 millimeters (e.g. approximately 5.7 millimeters) and the overall bead assembly height OHBA is approximately 7-11 millimeters (e.g. approximately 9.7 millimeters). The overall width OWN of the bead neck 416 is approximately 1.5 to 3.5 millimeters (e.g. approximately 2 millimeters) and the overall width/ thickness OWW is approximately 0.5 to 1.5 millimeters (e.g. 0.7 millimeters). The top 418 defines a thickness (height) TT of approximately 1 millimeter, and an overall width OWT of approximately 7 millimeters. Note that the width OWT of the top is highly variable in various embodiments and is selected to provide an adequate finger rest to apply manual snapping pressure between the bead and clip. In alternate embodiments, for example, the width OWT can rage between approximately 4 and 10 millimeters. Additionally, the width of the top 418 in each half, while shown as symmetrical about the web 420, can be asymmetrical—for example, the top can project as an "L" from one side/half of the bead assembly 410. Also, while shown as a "flat" or planar top, it can define a variety of trapezoidal, ovular, polygonal, curvilinear and/or other (e.g. tapering) cross section shapes. Likewise, the top thickness TT can vary between (e.g.) approximately 0.5 and 2.5 millimeters.

Figure 8:
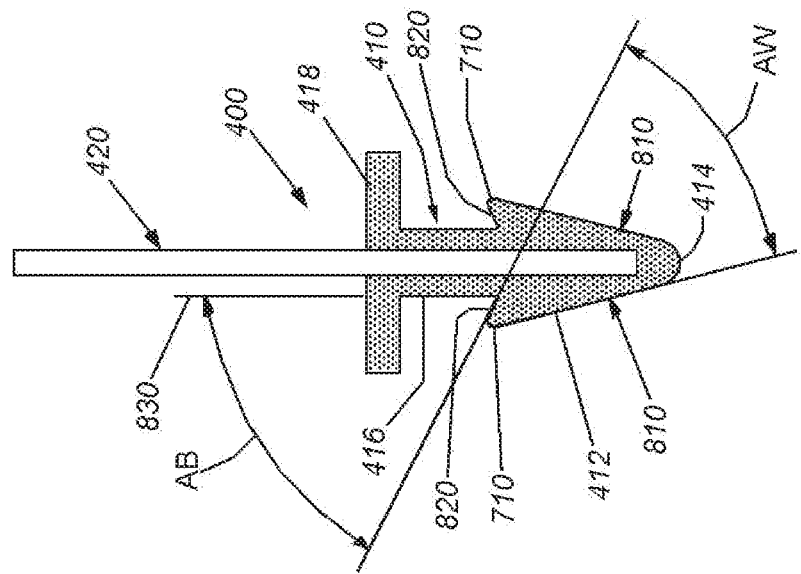
FIG. 8 is a side view of the illustrative listing of FIG. 4 showing relative angles of the various components of the bead assembly.

In this embodiment, the barbs 710 define top surfaces that are set off from each other at an overall angle OAB of approximately 122 degrees, symmetrical about the vertical (i.e. the direction of extension of the neck 416 and the web 420). It is expressly contemplated that the barb angle OAB can vary widely, in part to match that of the confronting clip bottom surfaces, as described further below. With further reference to FIG. 8, the bead 412 defines an angular geometry that is highly variable depending upon the clip geometry and other factors (e.g. material choice, pull-out force, push-in force, etc.). In an embodiment, the bead cross section defines two opposing, downwardly tapered, sloped walls 810 that are generally planar (note that they can be curved and/or a compound angle in alternate arrangements). The angle of the barbs 710 is also highly variable and, in part, is dependent upon the degree of resistance to pull-out (i.e. pull-out force) desired for the design. In an embodiment, the upper walls/faces 820 of the barbs 710 are each oriented at an (opposing) angle AB of approximately 61 degrees with respect to the vertical 830 (a line parallel to the plane of the neck 416 and web 420). The sloped bead walls 810 are each oriented at an angle AW of approximately 49 degrees relative to the respective barb walls 820 and 25 degrees with respect to each other.

Figure 9:
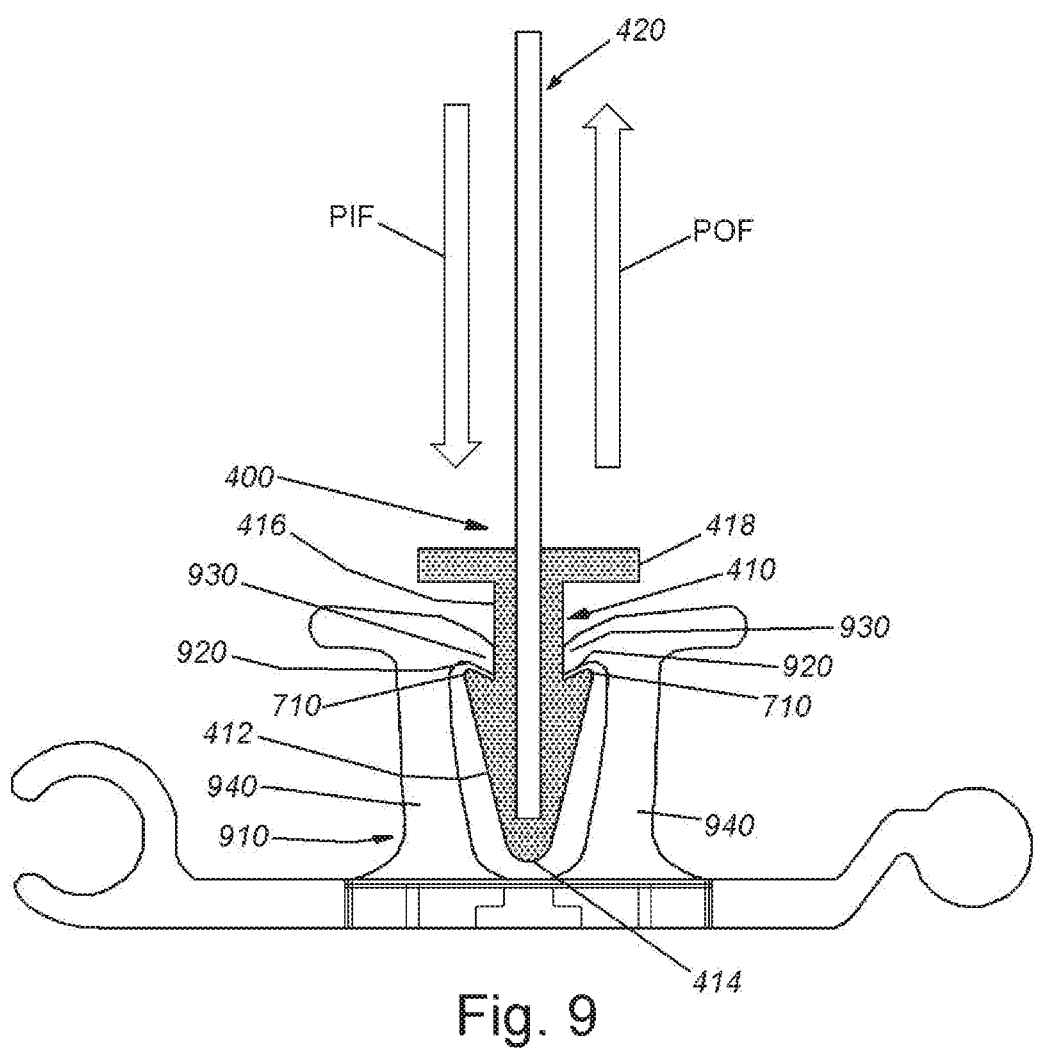
FIG. 9 is a side view showing the interconnection of the illustrative listing of FIG. 4 in engagement with an exemplary upholstery clip.

With reference now to FIG. 9, the engagement of the listing 400 with an exemplary clip 910 is shown in further detail. As noted above, the angle AB (FIG. 8) of the upper walls/faces 820 of the bead barb 710 are each "married" to the general angle of the bottom faces 920 of the clip barbs 930. The marriage of angles helps to increase pull-out force (arrow POF), and reduce the tendency of the clip legs 940 to flex open when the bead 412 is placed under tension. In engagement, the clip barbs 930 apply slight pressure to the listing bead neck 416, and define a resting gap that is slightly less than the neck width OWN. This geometric relationship, again, ensures a pull-out resistant engagement between the bead 412 and the clip 910. As described above, the slope of the bead 412 ensures a comfortable level of push-in force, in particular when an installer's thumb or other finger applies downward pressure (arrow PIF) to the flat top 418 of the bead assembly 410. While push-in and pull-out forces can vary widely, in an embodiment, the push-in force is specified as low as 20 to 30 Newtons while the pull-out force can exceed 150 Newtons.

With reference again to FIGS. 4 and 5, the web includes a plurality of spaced apart ovular (or semi-ovular) cutouts 450. The spacing SC1 and SC2 between cutouts is variable, and based upon the location of clips within the foam substrate trench (or other feature). The cutouts 450 can be any shape (e.g. circular, ovular, square, rectangular, polygonal, etc.), and are used as indicia of the respective location of each clip in the substrate so that an installer can feel for the location of the clip on the web and then apply push-in pressure to the bead top (418) based upon the location of the cutout. The length of the cutout can be approximately the same of the width of the clip to allow accurate alignment of the bead with the clip(s). The overall length LCO and height HCO of each cutout 450 is highly variable in various embodiments. It should provide sufficient tactile feedback to assist the installer in locating the bead with reasonable accuracy, in general in the absence of visual feedback on the relative location of the bead versus the clip(s). In an embodiment, the cutouts are each formed in the web as the assembled listing is directed down a line form the extrusion die—wherein the web and semi-hardened bead assembly are sandwiched (and fused) together—to a punch, laser cutter (or other hole-forming mechanism) that accurately forms each cutout at the appropriate location along the length of the listing. Individual listing pieces can then be cut to the appropriate length and trimmed to include (e.g.) bevels, notches, etc. on each end using the same cutting mechanism (e.g. the laser cutter) for a given seat design.

Figure 10:
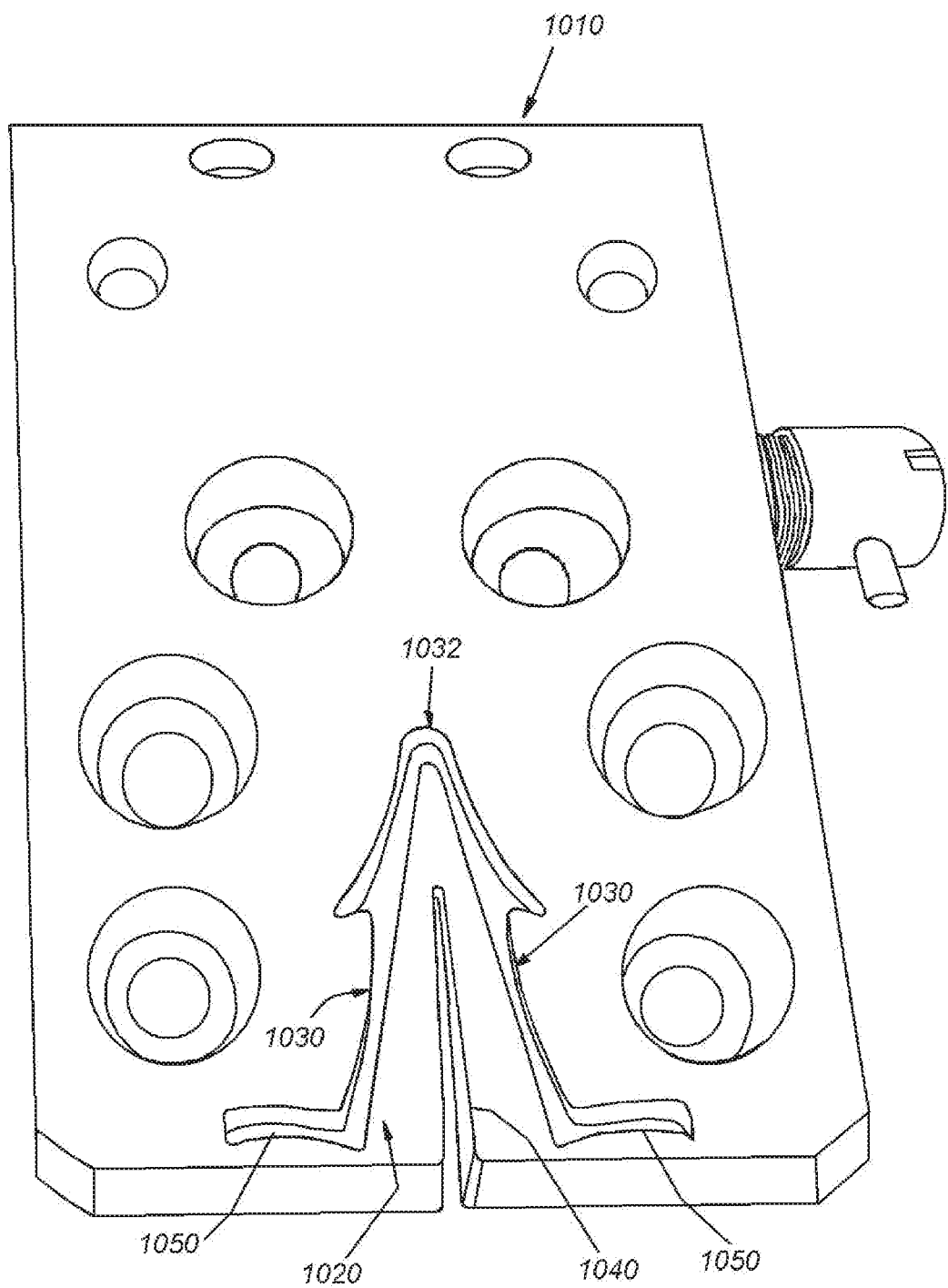
FIG. 10 is a top-oriented perspective view of an extrusion die for use in forming the bead assembly of the illustrative listing of FIG. 4.

As described, an exemplary extrusion die 1010 for forming the bead assembly (410) is shown in FIG. 10. The die 1010 includes the illustrative die cavity shape 1020, in which the halves 1030 are spread apart from the common tip 1032. A central channel 1040 guides the web between the halves 1030. A downstream forming arrangement (not shown) presses the semi-hardened, extruded halves together to fuse the web therebetween. This downstream arrangement should be clear to those of skill. As also shown, the flat top features 1050 are shown as outwardly extended wings on the die with a slightly curved shape to accommodate the internal forces generated as the halves are pressed together to form the final T-shaped top and neck around the web.

It should be clear that the above-described listing provides a more user-friendly listing bead shape and design, particularly for use in the manual assembly of listing to clips embedded in a foam substrate. It allows for the desired customization of seat designs that benefit from the employment of human installers. The flat top reduces fatigue on the installer's fingers and allows for significantly longer work time on the assembly line. The use of indicia in the form of web cutouts also enhances the efficiency and accuracy of assembly by providing a visual feedback to the assembler/operator(s) and positive tactile feedback to the assembler/installer (who inserts the bead into clips in the substrate) as to the location of individual clips in the substrate during assembly of the trim cover to the foam cushion. Likewise, the arrow-like cross section of the bead, and its upwardly angled barbs, allows for positive insertion and engagement (free of subsequent pullout) into a clip that is essentially covered and encased in foam, so as to advantageously reduce overall rattle in the assembled seat.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate space or system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Accordingly, this description is meant to be taken only by way of example, and not to otherwise limit the scope of this invention.

What is claimed is:

1. A listing for assembling trim covers to a foam substrate containing one or more clips comprising:
    a listing bead defining a cross section with a tapered shape with a bottom tip and upper barbs, and
    a strip if web material affixed to the listing bead, the web material defining at least one cutout in the web, the at least one cutout in the web located in at least one position relative to the one or more clips in the foam substrate during assembly of the listing to the one or more clips.

2. The listing as set forth in claim 1 wherein the bead assembly and the web are each composed of thermoplastic, and are bonded together.

3. The listing as set forth in claim 2 wherein the bead assembly is formed by extrusion in an extrusion die, and the web is sandwiched to the bead assembly as it exits an extrusion die in a semi-hardened state.

4. The listing as set forth in claim 1 wherein the tapered shape defines a pair of opposing surfaces oriented at an angle of approximately 25 degrees with respect to each other.

5. The listing as set forth in claim 1 wherein the neck defines a thickness constructed and arranged to generate flexure in opposing legs of the engaged one of clips.

6. A vehicle seat constructed with the clips of the foam substrate in engagement with the listing of claim 1.

7. The listing as set forth in claim 1, further comprising a neck extending above the barbs and a top that expands outwardly perpendicular to the tip and barbs on at least one side of the bead assembly and provides a surface for contact of an installer's finger therewith when providing a push-in force to engage the bead assembly with the one of the clips.

8. The listing as set forth in claim 7 wherein the top defines an overall outward extension width of between approximately 4 and 10 millimeters.

9. The listing as set forth in claim 7 wherein the top defines a substantially flat upper surface and the top and neck collectively define a T-shape.

10. The listing as set forth in claim 9 wherein the top defines a thickness perpendicular to the width of approximately 0.5-2.5 millimeters.

11. The listing as set forth in claim 10 wherein the thickness is approximately 1 millimeter.

12. The listing as set forth in claim 7 wherein the top extends outwardly in opposing directions from the neck on each of the opposing halves.

13. The listing as set forth in claim 1 wherein the bead assembly defines a pair of opposing halves that sandwich a web for attachment to the trim cover.

14. The listing as set forth in claim 1, wherein the at least one cutout is positioned to align with a corresponding clip in the foam substrate.

15. The listing as set forth in claim 1, wherein the at least one cutout is located on the web in a position configured to be above the clip prior to insertion of the bead within the clip.

16. The listing as set forth in claim 1, wherein a length of the hole is approximately the same as the width of the clip.

17. A method for assembling a trim cover to a vehicle seat to a foam substrate containing clips, comprising the steps of:
   positioning a listing bead defining a cross section with a tapered shape with a bottom tip and upper barbs, and a web affixed to the listing bead, the web defining at least one cutout in the web, the at least one cutout in the web located in at least one position relative to one or more clips in the foam substrate; and
   applying a push-in force to engage the bead assembly with the one of the clips so that the bead assembly becomes captured by barbs of each of the clips.

18. The method as set forth in claim 17 further comprising locating the clips in a trench of the foam substrate.

19. The method as set forth in claim 18 further comprising locating the at least one cutout in a position above the clip prior to insertion of the bead within the clip.

20. The method as set forth in claim 18 further comprising aligning the at least one cutout in the web with the clips.

\* \* \* \* \*

UNITED STATES PATENT AND TRADEMARK OFFICE
CERTIFICATE OF CORRECTION

| | |
|---|---|
| PATENT NO. | : 10,508,019 B2 |
| APPLICATION NO. | : 15/831294 |
| DATED | : December 17, 2019 |
| INVENTOR(S) | : Jeffrey A Agonia, Andrew W. Santin and Aleksandr V. Boguk |

Page 1 of 1

It is certified that error appears in the above-identified patent and that said Letters Patent is hereby corrected as shown below:

In the Claims

Column 8, Claim 1, Line 21, replace "a strip if web material" with --a strip of web material--

Signed and Sealed this
Twelfth Day of May, 2020

Andrei Iancu
*Director of the United States Patent and Trademark Office*